March 25, 1958  A. M. SKELLETT  2,828,484
SHIELD FOR ELECTROMAGNETIC RADIATIONS
Filed June 3, 1947
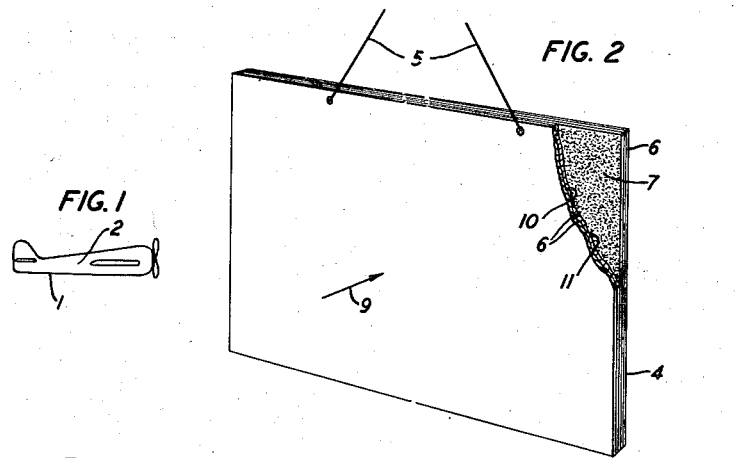
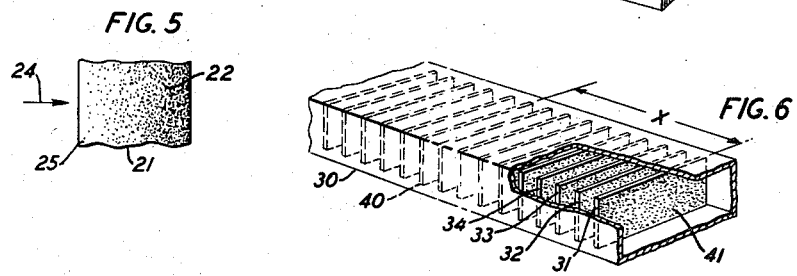
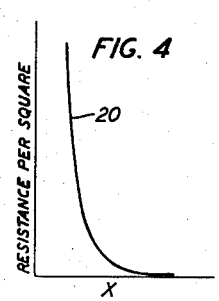
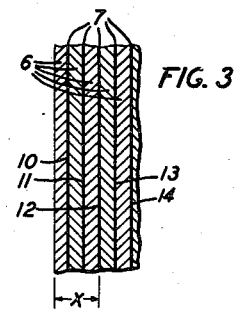
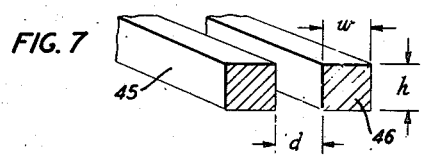
INVENTOR
A. M. SKELLETT
BY
ATTORNEY United States Patent Office 2,828,484
Patented Mar. 25, 1958

2,828,484
SHIELD FOR ELECTROMAGNETIC RADIATIONS

Albert M. Skellett, Madison, N. J., assignor to Bell Telephone Laboratories, Incorporated, New York, N. Y., a corporation of New York Application June 3, 1947, Serial No. 752,014

4 Claims. (Cl. 343—18)

This invention relates to the reflectionless absorption of electromagnetic radiation and in particular to the shielding of a target from radar or the like.

The present disclosure eliminates the reflection of echoes from the target by using a shield which will absorb the radiations incident thereagainst completely without reflection, with very slight directional selectivity and without a critical cut-off range.

The method used is somewhat analogous to that utilized in terminating a transmission line. Reflection-free termination is there secured by using an impedance having a value corresponding to the characteristic impedance of the line. It differs from such systems, however, because it is impossible to "terminate" space, which is, of course, continuous on the other side of the screen.

The invention contemplates interposing between the object and the source of the radar beam a shield having a resistance decreasing exponentially away from the beam source. The shield may consist of a plurality of evenly spaced parallel resistive layers, in which the resistances of the individual layers are exponentially related, or may have a continuously varying resistance throughout a solid supporting sheet.

In the former case, it is preferable that the first layer encountered by the beam be of at least twice the minimum resistance required for proper matching, since the beam "sees" this layer as being in parallel with the remaining layers. The subsequent layers will then be related exponentially to the value of the first. The overall thickness of the shield need not be substantially greater than half the wavelength of the radiations it is expected to absorb; all but a negligible fraction of the energy may be dissipated within a structure of this order of magnitude.

The laminar structure may be made very simply, as, for example, by utilizing plywood supporting layers in which the surfaces of the individual plies are coated with a layer of graphite or other highly resistive material suitable for the absorption of electromagnetic energy. The commercially known "Aquadag," a water suspension of colloidal graphite, is satisfactory for this purpose. The resistance is easily controllable by varying the percentage of water in the suspension before application to the laminae.

The angle of incidence of the radiations to be absorbed is not critical, since the exponential relation holds for all except small angles. Hence, the shielding layer can be applied to curved surfaces, such as the hull of a ship or the body of a plane, as well as to flat surfaces, such as might be used in the laboratory or to prevent interference between adjacent directive antenna systems, or to shield an entire building.

While shields for curved surface applications can be made and attached as separate units, the invention is even more readily applicable to those cases in which the entire plane or hull is constructed of molded plywood. The radar shield may then be formed as an integral part of the body structure.

The invention is also applicable to wave guides, and provides a superior means of broad band termination where stubs must be made reflectionless.

The invention may be better understood by reference to the drawings, in which are illustrated specific embodiments of the basic principles of the invention:

Fig. 1 is a side view of an airplane incorporating the invention;

Fig. 2 is a perspective view of a planar screen embodying the invention, partially broken away to show the laminar structure;

Fig. 3 is a fragmentary cross-sectional view of the embodiment of Fig. 2 and of a planar portion of the embodiment of Fig. 1, showing the relation between the resistive layers and the intermediate supporting laminar structure;

Fig. 4 is a graph showing the resistance per square of a resistive layer as a function of its spaced position in the shield;

Fig. 5 is a fragmentary sectional view of another embodiment of the invention;

Fig. 6 is a perspective view, partially broken away, of a wave guide terminated in accordance with the invention; and Fig. 7 is a schematic view showing two conductors in free space arranged to illustrate the mathematical relations explanatory of the invention.

It will be understood that the embodiments shown in these figures, while exemplary of the principles of the invention, are not to be interpreted as limiting its applications. All structures incorporating the invention as defined by the appended claims are deemed to be equivalents of those shown or described.

Referring now to Fig. 1, there is illustrated schematically an airplane 1, of otherwise conventional design, embodying the invention. The entire fuselage, together with the wings and tail structure, is covered by closely fitting, suitably curved sheets 2 of laminated absorbing material. These sheets 2 need be no thicker than half the longest wavelength of the beams to be intercepted, as will be explained hereinafter. Hence, particularly when dealing with opposing radar in the microwave band, the shield need be only of the order of a centimeter in thickness.

It will be apparent that the invention is likewise eminently suitable for use in planes, boats or other objects, having their structural parts made of plywood. It is especially applicable where those parts are molded and formed under pressure. The absorbing layers may be incorporated integrally with the entire structure at a minimum of cost during manufacture, without adding to the weight or changing the dimensions or performance characteristics, since the quantity of resistive material required is of negligible mass relative to that of the plane. The cross-section of a planar portion of the hull, the fuselage or wings will, in this case, be as illustrated fragmentarily in Fig. 3.

In Fig. 2 a planar shield 4 is illustrated which may be hung from cords 5, or mounted on any suitable standard, not shown, between the object to be concealed and the radar set whose beams it is desired to absorb. The screen 4 has been shown in a form suitable for use in the laboratory, where it may be desired to shield test apparatus from certain electromagnetic radiations, or to provide a wall covering which will suppress reflections within a testing room and confine radiations thereto.

The same type of panel construction may be used for baffles between short wave directional antennas, where a number of them must be mounted in a restricted space, to prevent interference between the transmitted beams. It is likewise adaptable for use as a surface covering for an entire building, or for a structure such as a large ship.

The shield 4 is partially broken away in Fig. 2 to show some of the resistive layers. It consists of a plurality of supporting layers, such as the plywood laminae 6, on each of which is fixed a layer 7 of colloidal graphite or an equivalent electrical conductor having substantial resistance. Any equivalent non-conductive material, such as bakelite, might be used, or in some applications, a resilient support, such as rubber, might be preferable. The layer 7 of resistance material may be formed on either one or both surfaces of each lamina. (In the sectional view of Fig. 3, the layers 7 appear merely as dividing lines between the laminae 6, since on the scale shown the graphite material is not susceptible of conventional representation.)

In Fig. 2, shield 4 is shown placed normal to the direction from which the electromagnetic radiation is expected to come, but, as explained above, it is almost equally effective for any angle of incidence of the radiations thereagainst except near zero. Assuming that the direction of incidence is as represented by the arrow 9, the "resistance per square" for the first resistive surface 10 encountered by the radiation is made at least twice the minimum value necessary, which is the characteristic impedance of free space. The "resistance per square" is the resistance of a square sheet of any dimension on a side, measured between metal strips fixed along parallel edges, and is independent of the linear dimension. The value of the second resistive layer 11 encountered is made equal to that of the first layer 10, since the incoming wave "sees" these layers as if they were in parallel. This results because the electric vectors of the successive waves are parallel at all the resistive layers. The resistance of each should, therefore, be at least twice the desired minimum value of 377 ohms, which is so selected in order to match the impedance of the absorbing unit to that of free space. The resistance per square of each of the layers 12, 13, 14, etc., subsequently encountered by the radiation is chosen so that the values reduce exponentially from that of the shunt resistance of the first two layers. This is illustrated in the graph of Fig. 4 in which curve 20 shows the "resistance per square" plotted as a function of $x$, where $x$ represents the distance of a particular resistive layer from the initially encountered surface of the shield. For example, $x$ is indicated in Fig. 3 for the third resistive layer, 11, and in Fig. 6 for the tenth layer 40.

Another embodiment of the invention is shown in fragmentary cross-section in Fig. 5. In this form, a continuous exponential impedance change through the shield is secured by introducing varying amounts of the resistive material into a solid supporting structure of non-conductive material.

In the figure, a panel or matrix 21 of polystyrene, plaster of Paris, or other equivalent material is shown with a quantity of graphite 22 dispersed therein. The graphitic material is introduced during the formation of the panel 21, and is distributed uniformly in all planes parallel to the panel. Arrow 24 indicates the direction of incidence against the initially encountered panel surface 25 of the radiations to be attenuated. The resistance per square encountered by the radiations decreases exponentially with the depth of penetration of the panel 21, as shown graphically in Fig. 4. This has been suggested in Fig. 5 by the stippling, which corresponds in weight to the exponential decrease of resistance with penetration of the panel.

In the embodiment shown in Fig. 6 the principle has been applied to the termination of a wave guide section 30 by inserting a plurality of parallel equally spaced resistive members 31, 32, 33, . . . , which completely fill the guide transversely. The tenth resistive member, 40, is shown with the spacing $x$ indicated for the graph of Fig. 4. The resistances of the successive layers are chosen in accordance with the formula described elsewhere herein. The reactive impedance of the wave guide, however, is less than that of free space, hence the resistances of the initially encountered layers may be less than in the embodiment of Fig. 2.

Thin sheets of non-conducting material, possessing a reasonable degree of rigidity may be used as the support for the resistive members. The commercially known phenolic resin condensation products, such as "Bakelite," are satisfactory for this purpose, as are hard fiber and dry cardboard. The sheets are coated with a proper concentration of resistive material such as colloidal carbon 41 in a suitable binder, and secured in the guide 30 by conventional means.

The mathematical justification of the invention may be understood from the following considerations, having reference to the schematic showing of a two-element transmission line in Fig. 7. Assume that parallel conductors 45 and 46, each having a width $w$ and a height $h$, are separated by a distance $d$, and let $w=d$. The surge impedance of this combination is substantially equal to that of free space, that is, $Z_0=377$ ohms, providing that the conductors 20 and 21 have infinite conductivity and that the space between them is infinitely resistive. Along the center of this line conditions are then substantially equivalent to those for propagation in free space. This impedance is given by the formula $$Z_0 = \sqrt{\frac{R+j\omega L}{G+j\omega C}} \qquad (1)$$

where the resistance $R=0$ and the conductance $G=0$.

It will be understood that, if the impedance of the line is varied exponentially, the reflected energy will be negligible. Thus we have $$Z_0 = \frac{e^{-ax}}{K} \qquad (2)$$

where $x$ is the distance measured in the direction of propagation and $K$ and $a$ are arbitrary constants.

In exponential transmission lines, the imaginary terms are changed to get this impedance variation. In the present case the real terms are varied to get the exponential impedance and to get absorption of the energy. Setting $$R = \frac{1}{G}$$

and neglecting the imaginary terms $$Z_0 = \frac{1}{G} \qquad (3)$$

Combining Equation 2 with 3, $$G = Ke^{ax} \qquad (4)$$

Since it has been assumed that the conductors of the hypothetical transmission line shown in Fig. 7 have unit cross-section, their conductivity equals that of the space between them, that is $$R = \frac{1}{G}$$

and they lose their identity. Thus, the assumption of negligible reflection from space having exponential conductivity is justified. The assumption that the imaginary terms in the equation may be neglected, is justified on the basis that these terms do not vary, and hence do not cause either reflection or absorption of energy.

In Equation 4 the constant $a$ determines the rate of change of conductivity, and $K$ determines the initial conductivity of the screen. For any wavelength $\lambda$ there is a minimum allowable value of $a$, that is, the rate of change of conductivity must not be too great, and consequently the screen must not be too thin. It has been found experimentally that the limiting minimum thickness is of the order of $$\frac{\lambda}{2}$$

All radiations shorter than this cut-off wavelength will be absorbed by the screen, but longer wavelengths will suffer some reflection.

Equation 4 gives values of conductivity for values of $x$ running from $-\infty$ to $+\infty$. For practical applications it is obvious that negative values of $x$ are of no significance and the screen may be constructed so that the surface upon which the radiations initially impinge will have a specific conductivity obtained by putting $x=0$ in the equation.

It will likewise be obvious that there is no necessity for using a number of laminae such that the resistance per square will be reduced to zero, since practically all the energy will have been absorbed in passing through a relatively small number of layers. Having determined for a particular embodiment first, the conductivity of the initial layer, and thus K, and secondly, the maximum value of conductivity, G, the constant $a$ is so selected that the thickness of the screen will be greater than one-half the desired cut-off wavelength. The conductivity at any point in the screen is then given exactly by the formula, independent of the angle of incidence, and of frequency above the cut-off value.

In a particular application, knowing the permissible over-all screen thickness, a number of layers may be chosen which has been found by laboratory test to give satisfactory absorption; the permissible over-all thickness, divided by the chosen number of layers will give the spacing between adjacent resistive layers. It will be apparent that a greater number of layers with reduced spacing, or a smaller number of layers with increased spacing, may be chosen, as long as adequate absorption is obtained. The specific value of resistivity of each of the individual layers may then be determined from Formula 4.

In a specific embodiment constructed as shown in Fig. 6, the value of K was taken as $4.55 \times 10^{-5}$ and $a$ was taken as ½. The wave guide 30 has a characteristic impedance of 338.5 ohms, but a very much larger value for the first resistive layer 31 was arbitrarily selected of 22,000 ohms. The value of the successive resistive layers then were:

| | | |
|---|---|---|
| 22,000 | 1,720 | 147 |
| 12,000 | 1,090 | 90 |
| 7,600 | 650 | 54 |
| 4,500 | 403 | 32.5 |
| 2,990 | 240 | 20.0 |

The termination section so constructed had a total length of 3.5 inches, the wavelength of the impinging radiations being 5.5 inches. In tests on this embodiment no measurable energy got clear through the resistive layers. The reflected energy was so low that the standing wave ratio measured 1.092, which is less than 1 decibel since the voltage ratio for 1 decibel is 1.122. This constitutes a broad band wave guide termination superior to those previously available.

The use of an initial layer considerably higher than the required minimum value is also advantageous in cases where a very thin multilayer panel of the type shown in Figs. 2 and 3 is desired.

From the foregoing description it will be apparent that the invention provides means for shielding objects from detection by radar, or for preventing reflection of electromagnetic radiations. The structure provided is simple, but effective over wide frequency ranges, and where used as a radar shield, free from undesirable directional effects.

What is claimed is:

1. An attenuator for radiant energy, comprising a plurality of spaced layers of exponentially varying resistive material decreasing from an average impedance for the first two of said layers encountered by incident radiant energy equal to at least the characteristic impedance of free space.

2. An attenuator for electromagnetic waves, comprising a spaced plurality of layers of resistive material wherein the resistance per layer reduces from an initial layer having a value of twice the characteristic impedance of free space.

3. An attenuator for electromagnetic energy comprising at least three layers of insulating supporting material having disposed therebetween layers of power-absorbent material the resistivity of which varies exponentially from layer to layer decreasing from an average impedance for the first two of said layers encountered by incident radiant energy equal to at least the characteristic impedance of the medium adjacent said attenuator.

4. An absorbent covering for attenuating incident electromagnetic energy comprising a plurality of laminae of non-conductive material having interposed therebetween an absorbent material having a specific resistivity varying exponentially from layer to layer and decreasing from an initial value for the initial layer encountered by said incident electromagnetic energy equal to at least twice the characteristic impedance of free space.

References Cited in the file of this patent

UNITED STATES PATENTS

| | | |
|---|---|---|
| 1,576,730 | Harth | Mar. 16, 1926 |
| 2,115,826 | Norton et al. | May 3, 1938 |
| 2,405,987 | Arnold | Aug. 20, 1946 |
| 2,409,599 | Tiley | Oct. 15, 1946 |
| 2,434,560 | Gunter | Jan. 13, 1948 |
| 2,436,578 | Korn et al. | Feb. 24, 1948 |
| 2,461,005 | Southworth | Feb. 8, 1949 |

FOREIGN PATENTS

| | | |
|---|---|---|
| 22,711/35 | Australia | May 21, 1936 |
| 22,711 | Australia | May 21, 1936 |
| 802,728 | France | June 13, 1936 |
| 585,460 | Great Britain | Feb. 7, 1947 |